United States Patent Office 3,542,659
Patented Nov. 24, 1970

3,542,659
PROCESS FOR THE PREPARATION OF
ANHYDROUS HYDRAZINE
Gilbert Gaussens, Saint-Mande, France, assignor to Commissariat a l'Energie Atomique, Paris, France
Filed Nov. 15, 1966, Ser. No. 594,473
Claims priority, application France, Nov. 19, 1965,
39,146; Oct. 7, 1966, 79,240
Int. Cl. B01j 1/00, 1/10
U.S. Cl. 204—157.1                10 Claims

ABSTRACT OF THE DISCLOSURE

Anhydrous hydrazine is prepared by irradiating liquid ammonia in the presence of acetone. The hydrazine is then separated from the mixture. The amount of acetone and the intensity of irradiation are controlled. Hydrogen atom interceptors are used.

---

Figure 1:
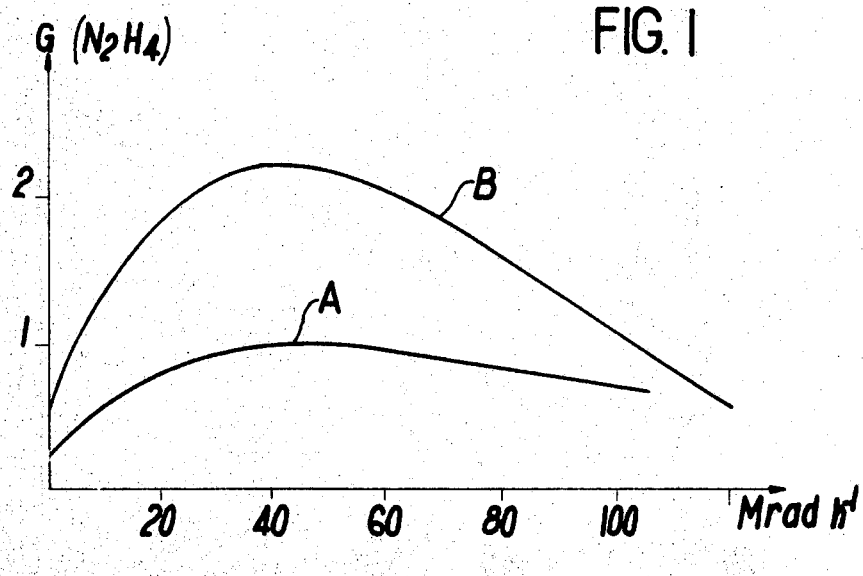

The present invention relates to processes for the preparation of hydrazine and more especially to processes for the direct preparation of anhydrous hydrazine by radiolysis of ammonia.

The conventional methods of manufacture of hydrazine consist in concentrating the Raschig liquor which is obtained by addition of a concentrated solution of ammonia in a solution of sodium hypochlorite. This concentration is carried out according to two methods.

The first method consists in distilling the purified Raschig liquor in three stages in order to obtain an 80% solution of hydrazine. The third distillation stage is highly dangerous since the distilled mixture becomes explosive when in contact with air. The 80% hydrazine solution which is obtained is then treated with dehydrating agents so as to result in a highly concentrated solution or in anhydrous hydrazine.

The second method consists in chemically extracting the hydrazine in the form of mineral or organic derivatives which are then subjected to a number of treatments resulting in highly concentrated solutions of hydrazine or in anhydrous hydrazine.

These processes for the preparation of hydrazine are attended by a large number of drawbacks. In the first place, apart from the number of operations which they entail as well as explosion hazards, they call for complex processing plants and the utilization of highly costly products.

In order to overcome these disadvantages, it has been proposed to prepare anhydrous hydrazine directly by radiolysis of liquid ammonia without any trace of moisture and by vacuum distillation of the mixture thus obtained.

However, radiolysis of ammonia results in very low yields of hydrazine which are in no way conducive to the profitable application of such processes.

The present invention makes it possible on the contrary to increase the radiolysis yield to a very appreciable extent by making use of interceptors of hydrogen atoms and/or free electrons, that is to say of compounds which are capable of preferentially collecting the atoms of hydrogen or free electrons. Said free electrons are usually in the form of ammoniated electrons or, in other words, electrons which are enclosed in a group of ammonia molecules.

The present inventor has found in particular that it is possible to obtain radiolysis yields which are at least double those of yields obtained by prior art methods, this result being achieved by carrying out the irradiation of ammonia in the presence of acetone. It can be assumed that the acetone acts as interceptor of hydrogen atoms or of free electrons although the processes involved in this action are not yet fully understood.

The proportion of acetone in the ammonia is advantageously comprise between 0.01 and 2 moles/l.

A secondary feature of the invention relates to the conditions of irradiation which are applied, and is the outcome of experiments on the radiolysis of ammonia as carried out with or without interceptor. As a consequence of these experiments, it has been possible to define values both of irradiation intensities and of preferential doses which are far higher than the ranges hitherto considered to be of the greatest practical interest. For example, the radiolysis of ammonia is usually carried out in accordance with known methods with irradiation intensities of the order of a few hundred thousand rads per hour. In point of fact, it had not been considered useful up to the present time to exceed intensities of one megarad per hour. However, the experiments conducted by the present inventors have clearly revealed that there exists an optimum intensity which is considerably higher than 1 Mrad/h. and that, at this optimum level, radiolysis yields G greater than 1 and of the order of 2 can be obtained in the presence of interceptors. The yield G is defined as the number of transformed molecules or of free radicals which are formed in respect of an energy of 100 electron volts effectively absorbed by the irradiated product.

In accordance with this secondary feature, the irradiation operation is carried out with an intensity which is comprised between 10 and 80 Mrads/h. and preferably between 25 and 50 Mrads/h. The irradiation dose is preferably higher than 100,000 rads and especially comprised between 100,000 and 500,000 rads.

In accordance with yet another feature of the invention, the irradiation of ammonia is carried out in the presence of at least one hydrogen atom interceptor, the proportion of acetone in the ammonia being in that case comprised between 0.1 and 2 moles/l. and preferably between 0.3 and 1 mole/l. Ter-butanol, triphenyl-methane, or chloroform are particularly suitable for use as hydrogen atom interceptors.

By way of example, chloroform is added to the ammonia in proportions comprised between 0.01 mole and 5 moles/l. and preferably 0.1 mole/l. The radiolysis of liquid ammonia which contains both acetone and chloroform in these proportions makes it possible to attain yields G at least of the order of 1, even in the case of irradiation intensities which are not within the preferential ranges given above. The yields referred-to are considerably higher than the values attained by means of prior processes.

The present invention also proposes a plant for the practical application of the process according to the invention, said plant being characterized in that it comprises means whereby ammonia to which interceptors are added is fed into a closed loop comprising means for circulating the ammonia between an irradiation cylinder provided with heating means and a reservoir provided with means for separating radiolysis gases, means for withdrawing irradiated ammonia from said loop and means for separating out the hydrazine which is obtained.

A few examples of practical application of the process according to the invention will now be indicated hereunder. The results which are recorded in the tables given hereinafter and in the accompanying FIGS. 1 and 2 clearly show the improvement which is obtained. There will then be described a particular form of construction of the plant for the execution of the process, reference being made to FIG. 3 in which said plant is illustrated diagrammatically.

In order to perform irradiation of ammonia for the production of hydrazine, recourse can be had to electromagnetic and corpuscular radiations and especially to either electrons, X-rays or gamma rays.

Irradiation of ammonia is carried out without any traces either of air or moisture. To this end, the process preferably comprises a preliminary stage of vacuum degassing of the liquid ammonia which contains the selected interceptors.

The irradiation process is preferably performed at a temperature which is higher than the normal temperature while nevertheless remaining below 90° C. In point of fact, it has been observed that the radiolysis yield G increases when the temperature and consequently the ammonia vapor pressure increase, provided that the temperature does not exceed a limit of the order of 90° C., above which the yield G falls off very sharply.

The separation of the hydrazine which is produced by radiolysis of ammonia can be carried out by any known means and in particular by freezing of the interceptors followed by distillation of the ammonia, so that the hydrazine remains in liquid phase.

In Table I below, there are shown the ammonia radiolysis yields obtained by irradiation of commercially available anhydrous liquid ammonia. After the addition of interceptors, said anhydrous liquid ammonia was cooled to less than 96° C. and degassed in a vacuum of $10^{-4}$ torr. After sealing the test-tube, the mixture was irradiated from a gamma source of cobalt-60.

In the examples which are recorded in this table, the irradiation always took place at a temperature of 21° C. and the irradiation intensity was of the order of one megarad per hour. This table already brings out the improvement in yield which is achieved compared with conventional irradiation under the same conditions (first example) when the operation is performed in the presence of acetone and above all in the presence of both acetone and a hydrogen atom interceptor, namely ter-butanol, isopropyl alcohol, or preferably chloroform.

The examples of irradiation which are recorded in Table II utilize intensities of the same order, but show the yield progression when the temperature rises from 21 to 86° C.

Tables III, IV and V give examples in which the irradiation of ammonia was effected by means of a pulsed-electron beam. For this purpose, recourse was had to a particle accelerator which produced electrons of energy 4 mev. (with a spectral width of 0.5 mev.) in the form of pulses of 2 microseconds duration with a repetition frequency of 375 c./s.

In view of the fact that the preferential irradiation intensities are of the order of 40 Mrads, the use of pulsed-electrons appears to constitute a particularly attractive solution inasmuch as it entails relatively low capital expenditure. Moreover, it has been found that high yields of hydrazine are thereby made possible. Another advantageous solution consists in resorting to the use of gamma radiations produced in nuclear reactors.

Tables III, IV and V clearly indicate the incidence of the irradiation intensity and dose on the hydrazine yield irrespective of the interceptor mixture employed, and even when no interceptors are present. They show the radiolysis yields G which are obtained by irradiation of ammonia by a pulsed-electron beam with different intensities and different irradiation doses. In the experiments which are recorded in Table III, the ammonia was irradiated alone, without interceptor. On the contrary, Table IV has reference to the irradiation of ammonia which contains 1 mole/l. of acetone and 0.1 mole/l. of chloroform, whilst Table V relates to the irradiation of ammonia containing different proportions of acetone to which was added in some cases a hydrogen atom interceptor other than chloroform.

Whether interceptors are employed for assisting the formation of hydrazine or not, it is apparent that the highest yields correspond to irradiation intensities of the order of 40 Mrads/h. These yields are of the order of 1 when no interceptors are present. They are distinctly higher when irradiation is carried out in the presence of the acetone-chloroform interceptor mixture and attain 2.24 in respect of an irradiation dose of the order of 400,000 rads.

From FIG. 1, the optimum irradiation intensity is readily apparent. This figure shows the variations in the yield G of hydrazine, shown as ordinates, as a function of the irradiation intensity in megarads per hour, shown as abscissae. Curve A relates to to the irradiation of pure ammonia. Curve B relates to the irradiation of ammonia containing 1 mole/l. of acetone and 0.1 mole/l. of chloroform. In all cases, the irradiation dose is 400,000 rads.

It is clear from this figure that the irradiation of ammonia in the presence of an interceptor mixture makes it possible to attain yields G which are distinctly higher than 2 when the irradiation intensity is equal to an optimum value in the vicinity of 40 Mrads/h.

Figure 2:
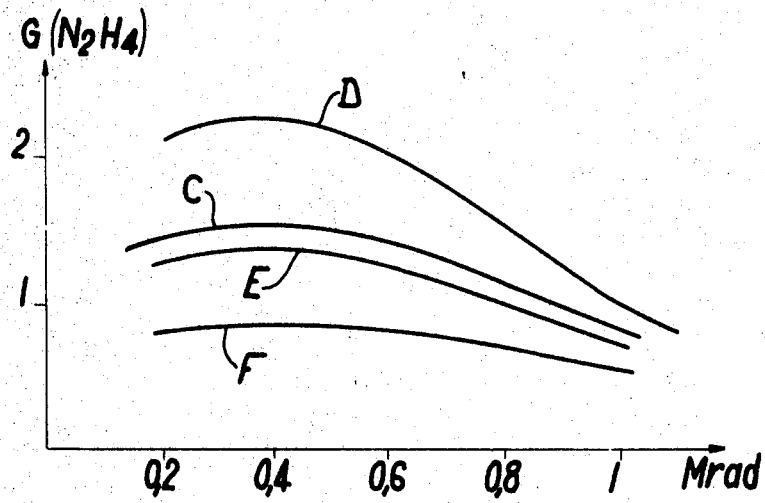

FIG. 2 shows the influence of the irradiation dose. In this case also, the irradiation of ammonia is carried out by means of a pulsed-electron beam. The ammonia receives an addition of the same interceptor mixture as indicated heretofore. Curves C, D, E, F represent the variations in the yield G of hydrazine as a function of the irradiation dose expressed in megarads per hour in respect of increasing values of irradiation intensity, respectively of the order of 10, 40, 80 and 110 Mrads/h.

Curve D, which corresponds to the optimum intensity, is located in the highest values of the yield G. In all the curves, the yield exhibits a maximum in respect of an irradiation dose value of the order of 0.4 Mrad.

There will now be described a particular form of construction of the plant in accordance with the present addition which makes it possible to perform continuous irradiation of ammonia for the production of anhydrous hydrazine.

Figure 3:
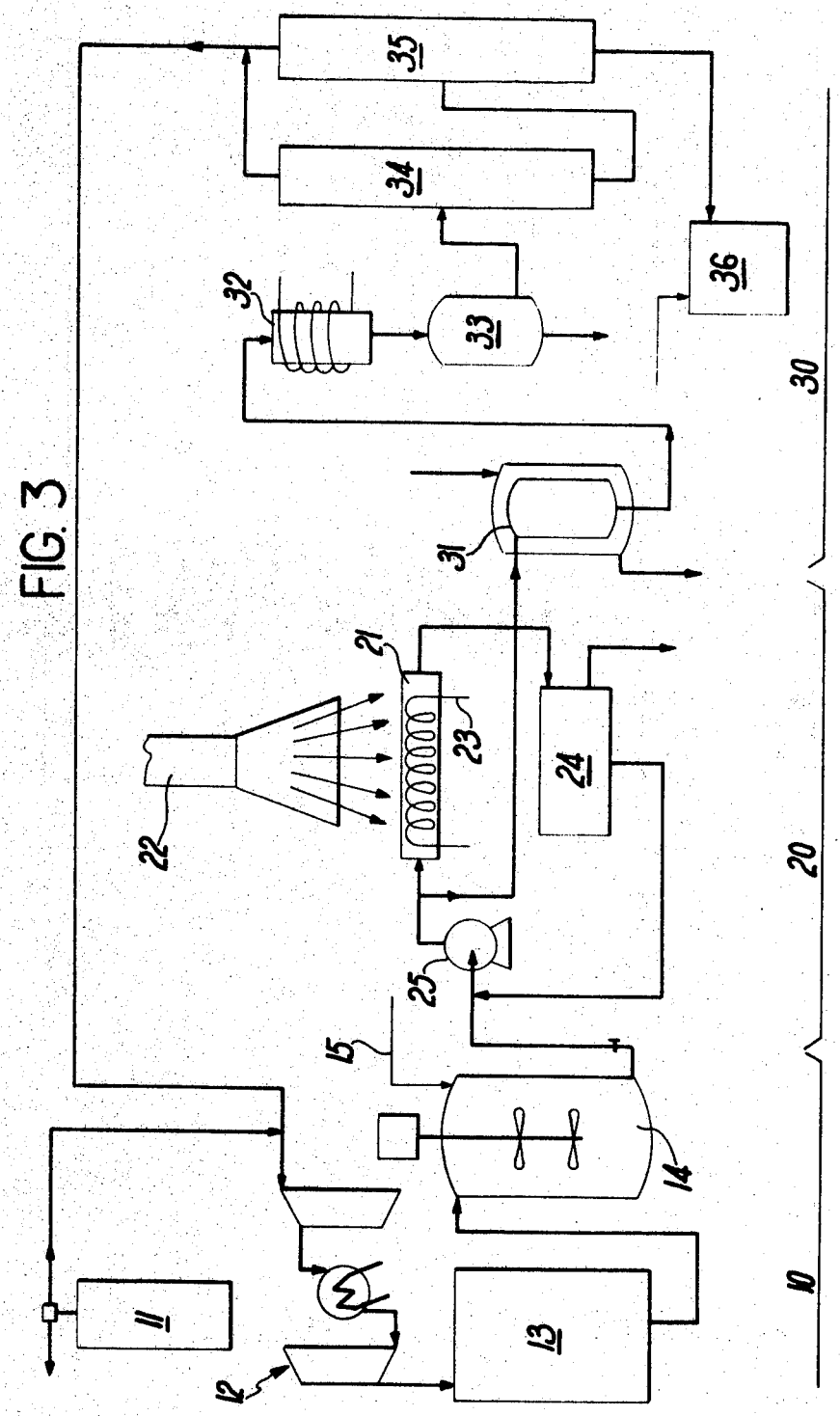

The plant herein described is shown diagrammatically in FIG. 3, and consists of three main sections:

a first section 10 which is reserved for the purification of ammonia and for the introduction of interceptors;

a second section 20 which is made up of an irradiation circuit in the form of a closed loop;

a third section 30 which contains the requisite equipment for separating the interceptors, for withdrawing and storing the hydrazine which is produced.

Commercial liquid ammonia is first purified at 11 in sodium in order to remove its main impurities, namely water, oxygen and carbon dioxide gas. The distilled ammonia is recirculated by a compressor 12 and liquefied. The purified ammonia is stored in liquid form in the reservoir 13, is periodically drawn off and transferred to a mixer 14 in which the addition of interceptors is carried out at 15.

The mixture which is obtained is fed periodically into the irradiation loop 20. It is apparent that the introduction of ammonia in said loop could also be carried out in continuous operation.

The irradiation loop 20 comprises an irradiation cylinder 21 which is placed in the electron beam provided by a particle accelerator 22. The cylinder 21 comprises a resistance-type heater element 23 which serves to heat the irradiated mixture to a temperature which is fixed at a value of 86° C., for example. The loop additionally comprises a reservoir 24 in which the gases which are formed during radiolysis and which are essentially hydrogen and nitrogen are separated from the ammonia and removed.

The ammonia and added interceptors are circulated continuously by means of a pump 25 between the irradiation cylinder 21 and the reservoir 24 in a closed cycle. The same pump 25 is also employed for withdrawing ammonia from the mixer 14 and feeding it into the third section 30 when said ammonia has been passed under the electron beam a sufficient number of times as determined by the irradiation dose to which it is intended to be subjected.

Moreover, the volume of the cylinder 21 and the time of retention of the ammonia in said cylinder during each processing cycle are determined as a function of the desired irradiation intensity which is in the vicinity of the optimum value of 40 Mrads/h. and as a function of the power of the available electron source.

By way of alternative, the irradiation operation can be performed, for example, by means of γ-rays produced in nuclear reactors, in which case the cylinder 21 is placed in the reactor core or in the vicinity of the core.

On completion of irradiation, the pump 25 returns the irradiated ammonia to serially-arranged heat exchangers 31 and 32, thereby making it possible to cool the ammonia to a temperature of the order of −78° C., which is the temperature of crystallization of the interceptors employed. The interceptors are then decanted and separated in the decanter 33.

The mixture of liquid ammonia and hydrazine is then fed into two columns 34 and 35 which are connected in series and in which the distillation of the ammonia is performed under pressure. In order to improve the economic performance of the process, the necessary heat is provided by water which is heated by transfer with the irradiated ammonia within the heat exchanger 31. The distillation columns are heated to 32° C. At this temperature, the vapor pressure of the ammonia is approximately 12.6 kgs./cm.$^2$, whereas the vapor pressure of hydrazine is 0.28 kgs./cm.$^2$. These values are sufficiently different from each other to permit of complete separation of the two constituents.

Anhydrous liquid hydrazine is obtained at the base of the distillation column 15 and passed into a reservoir 36 in which it is stored in a dehydrated nitrogen stamosphere.

The ammonia which is distilled at the top of columns 34 and 35 at a pressure of 6 kgs./cm.$^2$ in the particular case herein described is recycled. Accordingly, said distilled ammonia is recirculated by the compressor 12 which comprises intermediate cooling stages and which passes the liquefied ammonia into the storage reservoirs 13.

TABLE I

| Weight NH$_3$, g. | Interceptor(s) | Concentration, mole/l. | Intensity, Mrad/h. | Dose, 10$^3$ rads | N$_2$H$_4$, 10$^{-3}$ mg. | G |
|---|---|---|---|---|---|---|
| 3.1210 | None | None | 1.700 | 248 | 5.5 | 0.21 |
| 3.2497 | Acetone | 0.0503 | 1.615 | 215 | 9.8 | 0.42 |
| 3.3325 | do | 0.418 | 1.615 | 215 | 12.2 | 0.51 |
| 3.2089 | Ter-butanol / Acetone | 2.0 / 0.6 | 1.615 | 215 | 14.4 | 0.62 |
| 3.2425 | Ter-butanol / Acetone | 2.0 / 1.30 | 1.615 | 215 | 15.2 | 0.66 |
| 3.2530 | Isopropyl alcohol / Acetone | 1.90 / 0.6 | 1.615 | 215 | 12.1 | 0.52 |
| 3.2029 | Isopropyl alcohol / Acetone | 1.90 / 1.2 | 1.615 | 215 | 12.2 | 0.53 |
| 3.2520 | Chloroform / Acetone | 0.25 / 1.3 | 1.615 | 215 | 28.75 | 1.23 |
| 3.5010 | Chloroform / Acetone | 0.1 / 1.2 | 1.552 | 155 | 25.4 | 1.40 |
| 3.1979 | Chloroform / Acetone | 0.09 / 0.51 | 1.43 | 214 | 35 | 1.54 |

TABLE II

| Weight NH$_3$, g. | Interceptor(s) | Concentration, mole/l. | Intensity, Mrad/h. | Dose, 10$^3$ rads | N$_2$H$_4$, 10$^{-3}$ mg. | G |
|---|---|---|---|---|---|---|
| 3.3505 | Chloroform / Acetone | 0.1 / 1.3 | 0.968 | 210 | 22.2 | 0.95 |
| 3.8145 | Chloroform / Acetone | 0.1 / 1.3 | 0.740 | 233 | 36.5 | 1.23 |
| 3.4898 | Chloroform / Acetone | 0.1 / 1.3 | 0.740 | 233 | 37.8 | 1.40 |

TABLE III.—RADIOLYSIS OF AMMONIA—WITHOUT INTERCEPTOR

| Weight NH$_3$, g. | Intensity, Mrad/h. | Dose, rads | N$_2$H$_4$ 10$^{-3}$ mg. | G |
|---|---|---|---|---|
| 3.3040 | 9±2 | 99,000 | 6.7 | 0.61 |
| 4.4400 | 9±2 | 210,000 | 19 | 0.61 |
| 3.6355 | 9±2 | 460,000 | 33.4 | 0.60 |
| 3.3510 | 9±2 | 910,000 | 45.7 | 0.45 |
| 2.7605 | 38±3 | 88,000 | 8.1 | 1.00 |
| 3.4829 | 38±2 | 272,000 | 31.2 | 1.00 |
| 3.3293 | 38±3 | 324,000 | 46 | 1.00 |
| 3.2510 | 38±3 | 600,000 | 54.6 | 0.84 |
| 3.4220 | 38±3 | 1,000,000 | 63.8 | 0.56 |
| 3.2300 | 70±4 | 63,500 | 5.80 | 0.85 |
| 3.7400 | 70±4 | 209,000 | 21.0 | 0.81 |
| 3.3030 | 70±4 | 274,000 | 24.0 | 0.79 |
| 3.4100 | 70±4 | 505,000 | 42.5 | 0.74 |
| 3.3560 | 70±4 | 950,000 | 56.5 | 0.53 |
| 3.5640 | 110±5 | 155,000 | 12.8 | 0.69 |
| 3.3940 | 110±5 | 280,000 | 25.8 | 0.70 |
| 3.4110 | 110±5 | 702,000 | 48.5 | 0.61 |

TABLE IV.—RADIOLYSIS OF AMMONIA

Interceptor:
    Acetone—1 mole/l.
    Chloroform—0.1 mole/l.

| Weight, NH$_3$ g. | Intensity, Mrad/h. | Dose, rads | N$_2$H$_3$ 10$^{-3}$ mg. | G |
|---|---|---|---|---|
| 3.4820 | 10±2 | 181,000 | 31.0 | 1.37 |
| 3.2460 | 10±2 | 207,500 | 31.2 | 1.44 |
| 3.3473 | 10±2 | 400,000 | 66.0 | 1.48 |
| 3.1092 | 10±2 | 480,000 | 74.5 | 1.50 |
| 3.3510 | 10±2 | 710,000 | 106— | 1.34 |
| 3.4570 | 10±2 | 980,000 | 110— | 0.95 |
| 3.1128 | 40±3 | 259,000 | 75 | 2.20 |
| 3.0890 | 40±3 | 392,000 | 90 | 2.24 |
| 3.3810 | 40±3 | 625,000 | 153 | 1.92 |
| 3.2915 | 40±3 | 1,000,000 | 110 | 1.00 |
| 3.5115 | 80±4 | 178,000 | 26.1 | 1.30 |
| 3.1495 | 80±4 | 382,000 | 52.5 | 1.32 |
| 3.4100 | 80±4 | 640,000 | 89 | 1.22 |
| 3.2510 | 80±4 | 920,000 | 92 | 0.90 |
| 3.4620 | 110±5 | 132,000 | 12.5 | 0.83 |
| 3.4170 | 110±5 | 328,000 | 30.5 | 0.83 |
| 3.1510 | 110±5 | 575,000 | 48.5 | 0.80 |
| 3.2310 | 110±5 | 950,000 | 63 | 0.60 |

TABLE V

| Weight NH$_3$, g. | Interceptor(s) | Concentration, mole/l. | Intensity, Mrad/h. | Dose, $10^3$ rads | N$_2$H$_4$ $10^{-3}$ mg. | G (N$_2$H$_4$) |
|---|---|---|---|---|---|---|
| 3.7234 | Acetone | 0.16 | 45 | 500 | 47 | 0.76 |
| 3.3750 | do | 0.48 | 40 | 450 | 55 | 1.09 |
| 3.3845 | do | 0.97 | 40 | 450 | 62 | 1.23 |
| 3.3533 | do | 0.72 | 33 | 360 | 37 | 0.92 |
| 3.3739 | do | 0.98 | 33 | 360 | 42 | 1.04 |
| 3.3143 | Triphenylmethane / Acetone | 2.1 10$^{-2}$ / 0.99 | 20 | 220 | 30 | 1.24 |
| 3.1288 | Triphenylmethane / Acetone | 2.4 10$^{-2}$ / 1.05 | 22 | 190 | 25 | 1.27 |
| 3.2843 | Triphenylmethane / Acetone | 1.50 10$^{-2}$ / 1.00 | 20 | 190 | 27 | 1.30 |
| 3.4277 | Ter-butanol / Acetone | 0.95 / 0.98 | 20 | 220 | 29 | 1.15 |
| 3.4886 | Ter-butanol / Acetone | 0.38 / 0.95 | 27 | 300 | 45 | 1.29 |
| 3.3764 | Ter-butanol / Acetone | 0.14 / 0.98 | 29 | 320 | 48 | 1.33 |
| 3.2236 | Isopropyl alcohol / Acetone | 1.07 / 1.10 | 33 | 360 | 47 | 1.22 |
| 3.4330 | Isopropyl alcohol / Acetone | 0.55 / 0.98 | 33 | 360 | 46 | 1.12 |

What we claim is:

1. A process for the preparation of anhydrous hyrazine comprising irradiation of liquid ammonia in the presence of acetone and separation of the hydrazine which is formed by radiolysis.

2. A process in accordance with claim 1, wherein irradiation is performed in the presence of acetone, in a proportion comprised between 0.01 and 2 moles/liter.

3. A process in accordance with claim 2, wherein the separation of the hydrazine which is formed comprises freezing and separation of acetone and additionally of the hydrogen atom interceptors followed by distillation of the ammonia performed under pressure.

4. A process in accordance with claim 1, wherein irradiation is performed with an intensity which is comprised between 25 and 50 Mrads/h.

5. A process in accordance with claim 1, wherein the irradiation dose is higher than 100,000 rads and up to 600,000 rads.

6. A process in accordance with claim 1, wherein the irradiation is performed in the presence of 0.3 to 1 mole/l. of acetone and at least one hydrogen atom interceptor selected from the group consisting of ter-butanol, triphenylmethane, chloroform.

7. A process in accordance with claim 6, wherein said hydrogen atom interceptor is chloroform in a proportion comprised between 0.1 mole/l. relative to the ammonia.

8. A process in accordance with claim 1, wherein irradiation is performed by means of a pulsed electron beam.

9. A process in accordance with claim 1, wherein irradiation is performed by means of gamma rays produced in a nuclear reactor.

10. A process as described in claim 1, the irradiation of liquid ammonia being carried out at a temperature of from 21° to 90° C.

References Cited

UNITED STATES PATENTS 3,342,713  9/1967  Williams _____ 204—157.1
3,345,279  10/1967  Levy _____ 204—157.1

HOWARD S. WILLIAMS, Primary Examiner

U.S. Cl. X.R.

204—193